United States Patent [19]

Raucci, Jr. et al.

[11] 4,363,403
[45] Dec. 14, 1982

[54] CASSETTE STORAGE CONTAINER

[75] Inventors: Charles C. Raucci, Jr., Wooddale; Timothy J. Raucci, Handover Park, both of Ill.

[73] Assignee: Village Mold Co., Inc., Addison, Ill.

[21] Appl. No.: 290,886

[22] Filed: Aug. 7, 1981

[51] Int. Cl.³ .............. B65D 85/67; B65D 43/14; E05C 19/12
[52] U.S. Cl. .................. 206/387; 206/1.5; 220/339; 292/175; 292/128
[58] Field of Search .......... 206/387, 1.5; 220/306, 220/307, 337, 339, 340; 292/87, 121, 128, 175, DIG. 38

[56] References Cited

U.S. PATENT DOCUMENTS

| 2,571,353 | 10/1951 | Felsch | 292/128 |
|---|---|---|---|
| 3,552,551 | 1/1971 | Goldberg et al. | 206/403 |
| 4,102,452 | 7/1978 | Sato et al. | 206/387 |
| 4,184,594 | 1/1980 | Hehn | 206/387 |
| 4,231,474 | 11/1980 | Takahashi | 220/306 X |

FOREIGN PATENT DOCUMENTS 1137954 10/1962 Fed. Rep. of Germany ...... 206/403

Primary Examiner—William T. Dixson, Jr.
Assistant Examiner—Brenda J. Ehrhardt
Attorney, Agent, or Firm—Robert F. Van Epps

[57] ABSTRACT

A storage container for holding a tape cassette which container is adapted for molding in a unitary structure of a thermoplastic material. The container includes an improved single latching arrangement incorporating integrally molded leaf springs. Also locking tabs are molded with the top or bottom wall which are adapted to engage corresponding apertures provided at each end of the spine of the container such that when opened the container does not open to a completely flat configuration.

9 Claims, 5 Drawing Figures

CASSETTE STORAGE CONTAINER

BACKGROUND OF THE INVENTION

1. Field of the Invention

The present invention relates generally to the field of containers and more particularly to an improved storage container for magnetic tape cassettes.

2. Description of the Prior Art

As the use of cassettes to house reels of magnetic tape; (e.g. audio, video and computer), has expanded, a variety of containers have been developed to protect cassettes in storage transportation and handling. Typical of such prior art containers is that described in U.S. Pat. No. 4,184,594 which issued to Bruce A. Hehn on Jan. 22, 1980. That container as well as others of the prior art exhibit several common deficiencies which are undesirable and make them cumbersome to use.

Generally the prior art containers include either fixed or moveable hubs for engaging the cassette reels and locating the cassette within the container. Such containers are also configured such that when opened, the outer surface is substantially flat. While such a configuration may be desirable for ease of molding, the containers are difficult for the user to handle when open. Prior containers also generally rely upon either a friction fit between the top and bottom or on cumbersome latching arrangements to hold the container closed. The user is thus required to use two hands to open and close the container.

OBJECTS AND SUMMARY OF THE INVENTION

From the preceding discussion it will be understood that among the various objectives of the present invention are included the following:

the provision of a new and improved cassette storage container;

the provision of a container of the above-described character which is adapted to be molded as a unitary structure;

the provision of a container of the above-described character which eliminates the need for locating reel hubs;

the provision of a container of the above-described character which does not open to a flat configuration; and the provision of a container of the above-described character having an improved latching arrangement.

These and other objectives of the present invention are efficiently achieved by providing an integrally molded structure having a first surface with opposed end walls and a side wall extending along one edge between said end walls. A hinged spine extending along the edge of the first surface opposite the side wall is hinged at its opposite edge to a second surface. A latch with integrally molded leaf springs is formed at the edge of the second surface opposite the spine. The latch is provided with stop tabs and the edge of the second surface opposite the spine has spring engaging means such that the latch may be rotated with respect to the second surface and locked into position with respect thereto and engages an aperture in the side wall of the first surface when the container is closed.

The foregoing as well as other objects, features and advantages of the present invention will become more apparent from the following detailed description taken in conjunction with the various views of the appended drawings.

DESCRIPTION OF THE PREFERRED EMBODIMENT

Figure 1:
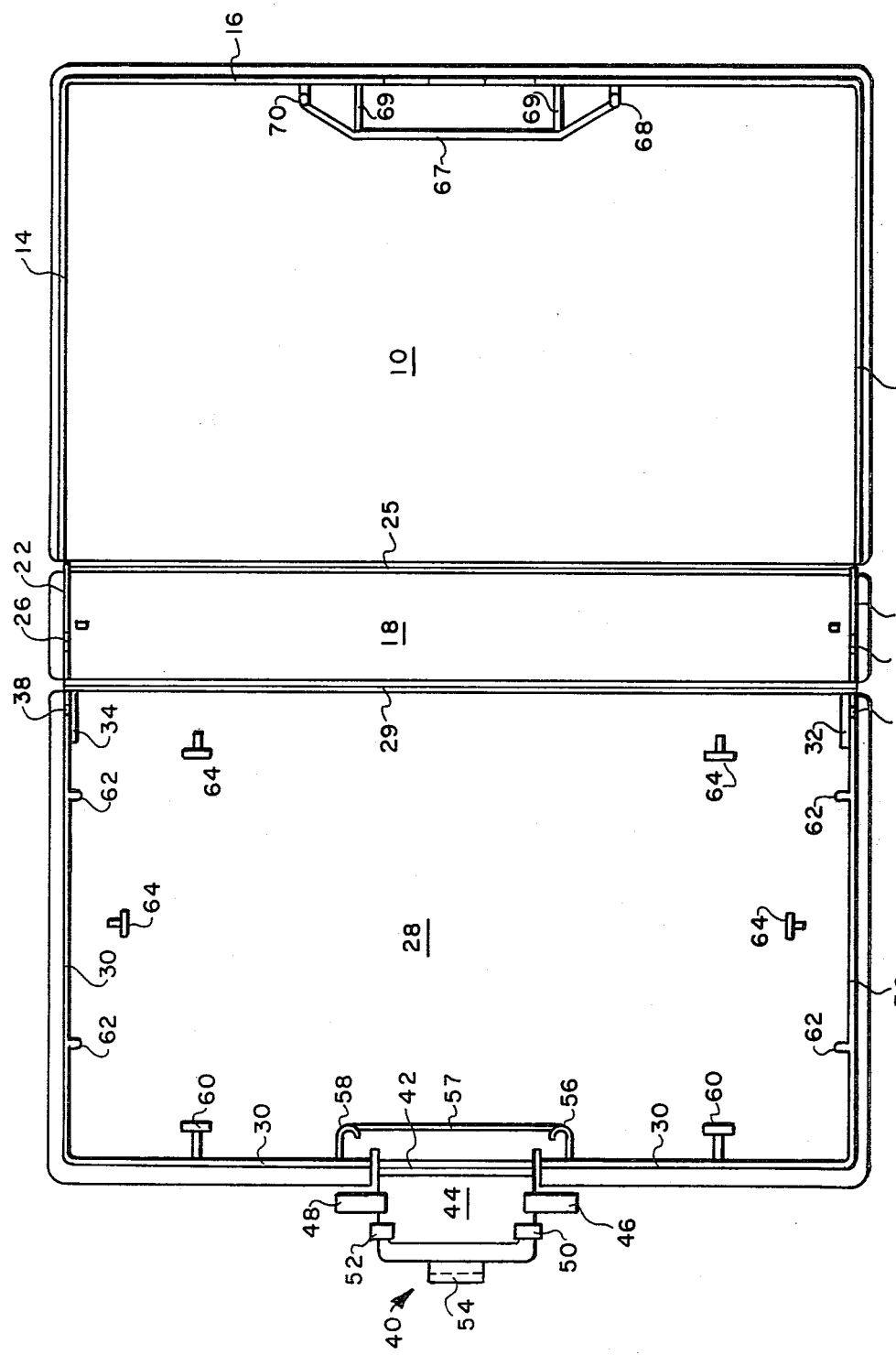
FIG. 1 is a plan view of a container in accordance with the principles of the present invention as molded in a unitary structure.

Turning now to FIG. 1 there is shown in plan view a cassette storage container as it would appear upon removal from a mold. The entire container is adapted to be molded in a single piece of a thermoplastic material such as polypropylene or a copolymer. The view of FIG. 1 is of what in use will be the interior of the container.

A first substantially flat surface 10 is provided with opposed end walls 12 and 14 and a side wall 16. The wall depth corresponds to the thickness of the type of cassette the container is intended to accommodate. The wall 16 is provided with first and second locating tabs 68 and 70 as well as a strength rib 67 which is tied to the interior of wall 16 by ribs 69. This construction provides added structural rigidity to wall 16.

A spine 18 is molded to the edge of surface 10 opposite wall 16 and has tabs 20 and 22 molded at the ends. Each tab 20 and 22 is provided with an aperture 24 and 26 respectively. The spine 18 is connected to the edge of surface 10 by a so-called "living hinge" 25.

A second surface 28 is molded to the opposite edge of spine 18 also by a "living hinge" 29 and is provided with a lip 30 proximate its outer edges. The second surface 28 is of substantially the same overall dimensions as the first surface 10 and the lip 30 is dimensioned such as to fit within the walls 12, 14 and 16 on the first surface 10 when the container is closed. The lip 30 is in alignment with the tabs 20 and 22 on the spine 18 and has molded at the ends thereof upwardly extending members 32 and 34 each having an outwardly extending locking tab 36 and 38 respectively. Thus, when the second surface 28 is rotated about the living hinge 29 the locking tabs 36 and 38 engage the apertures 24 and 26 and retain the spine 18 at substantially a right angle with respect to the second surface 28.

A latch 40 is molded to the edge of second surface 28 via living hinge 42 and includes a touch plate 44 having first and second leaf springs 46 and 48 and stop tabs 50 and 52 molded at the ends thereof. A locking tab 54 is molded at the outer edge of touch plate 44.

The lip 30 is provided with first and second inwardly extending "j" shaped retainers 56 and 58 such that when the touch plate 44 is rotated inwardly about the living hinge 42 the leaf springs 46 and 48 engage the retainers 56 and 58 respectively and thus place outward pressure on the touch plate 44. The stop tabs 50 and 52 rest against the inner surface of lip 30 and serve to restrict the maximum outward movement of the touch plate 44. The retainers 56 and 58 are joined by a strength rib 57 to provide added rigidity.

The lip 30 is further provided with a plurality of locator tabs 60 to prevent a cassette or any exposed tape, from engaging the retainers 56 and 58. A plurality of locator cushions 62 may also be molded on the inner surface of lip 30. Particularly in the implementation of the present invention as a storage container for video cassettes, additional cassette locator tabs 64 may be molded on the second surface 28 to correspond to the smaller of the two popular size cassettes currently in production. To use the container for the larger size cassette the locator tabs 64 may be eliminated simply by placing inserts in the mold during fabrication. Thus a single molded container may be used to store either size cassette.

Figure 2:
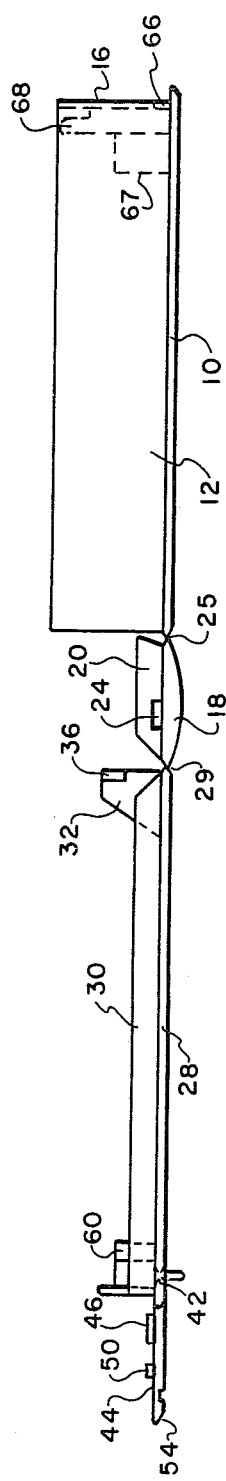
FIG. 2 is an end view of the container shown in FIG. 1.

With reference to FIG. 2 there is shown an end view of the apparatus of FIG. 1 wherein like elements are identified by like reference characters. Additional features not shown in FIG. 1 are an aperture 66 disposed through wall 16 such that when the container is closed, the locking tab 54 snaps into engagement with the aperture 66 under the loading of leaf springs 46 and 48. Locating tabs 68 and 70 may be molded on the inner surface of wall 16 such as to engage the lip 30 when the container is closed. Also shown in FIG. 2 is a variation of the end tab 20 on spine 18. The tabs 20 may be formed slightly oversize at the end adjacent the living hinge 25 such that when the container is folded to the closed position it will tend to spring open when the latch is released. The container thus may be held in one hand while the touch-plate 44 is depressed and is self-opening. It will be noted, however, that due to the engagement of locking tab 26 with aperture 24 the spine 18 will not open from the surface 28. In this manner an edge is maintained making handling of the container while open easier than containers of the prior art which open to a fully flat configuration.

Figure 3:
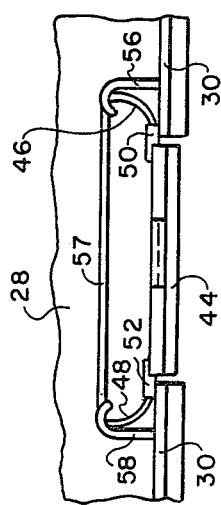
FIG. 3 is a more detailed view of the container latch in its operating position.

FIG. 3 is a more detailed view of the improved latch of the present invention in its operating position. As described hereinabove with respect to FIG. 1 the integrally molded leaf springs 46 and 48 engage the retainers 56 and 58 respectively and exert an outward pressure on the touch plate 44. Outward movement by the touch-plate 44 is restricted by the stop tabs 50 and 52 resting against the interior of lip 30. By depressing the touch plate 44 against the outward pressure of leaf springs 46 and 48 the locking tab 54 (FIG. 4) is caused to disengage the aperture 66 in wall 16 to open the container. When closed the outward pressure of the leaf springs 46 and 48 provides a secure engagement of the locking tab 54 with the aperture 66 thus preventing accidental opening of the container.

Figure 4:
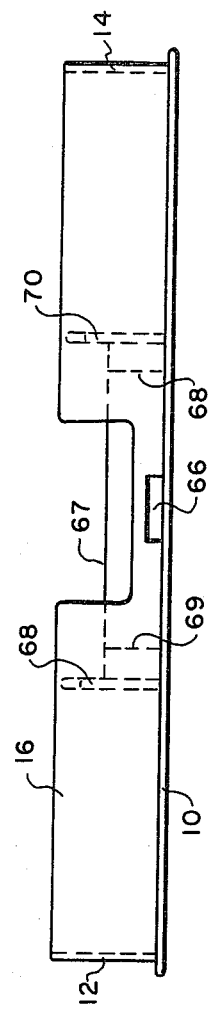
FIG. 4 is a side plan view of the container.

FIG. 4 is an edge elevation view of the container which more clearly illustrates the aperture 66 in wall 16 as well as the locating tabs 68 and 70, which are joined by a molded strength rib 67 tied to wall 16 by additional ribs 69.

Figure 5:
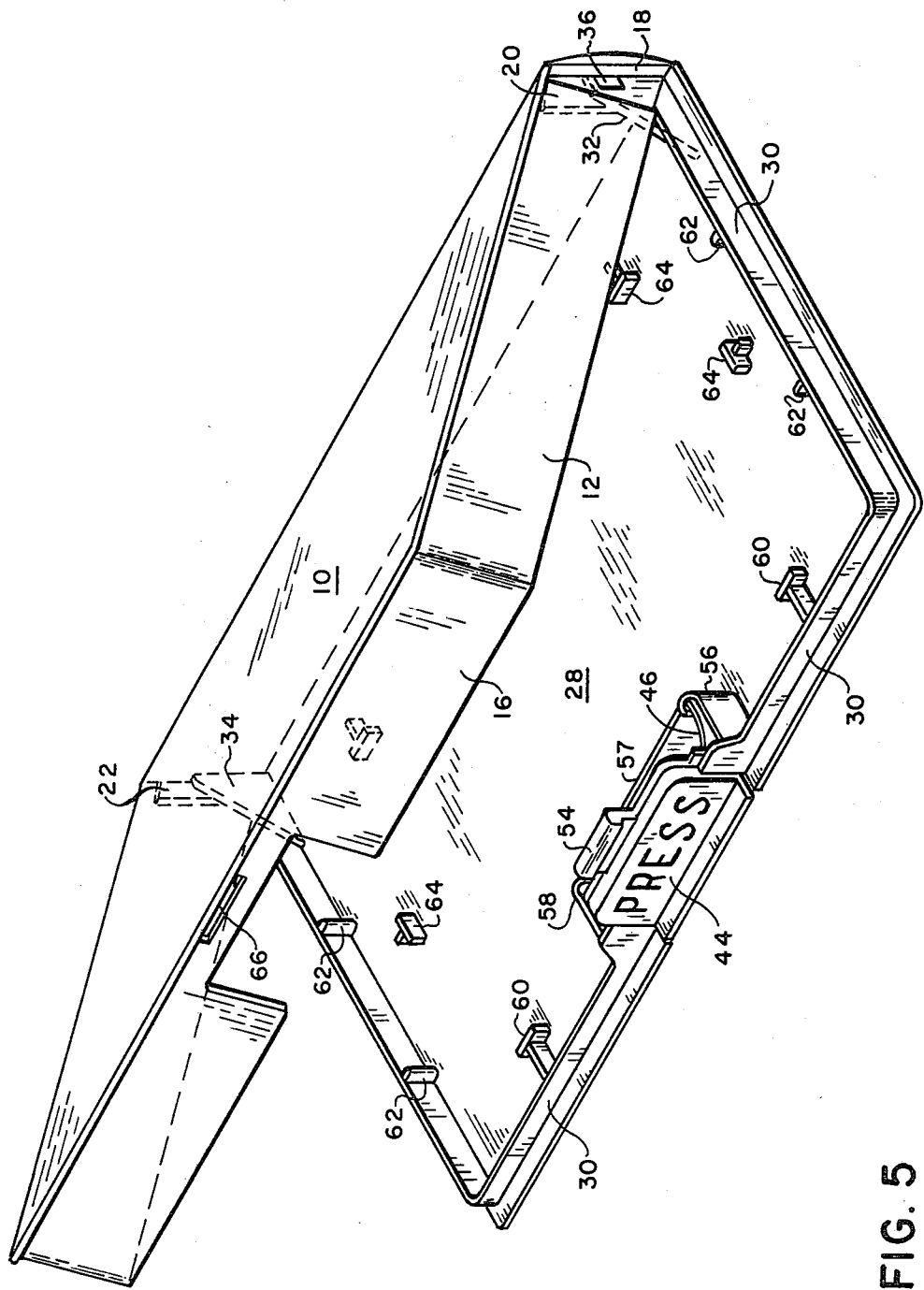
FIG. 5 is a perspective view of the container.

FIG. 5 illustrates the container of the present invention folded into its operating configuration and wherein previously described elements are identified by like reference characters.

From the foregoing description it will be understood that the applicants have provided a new and improved cassette storage container whereby the objectives set forth hereinabove are efficiently achieved. Since certain changes and modifications of the above-described invention will occur to those skilled in the art without departure from the scope of the invention it is intended that all matter contained in the preceding description or shown in the appended drawings shall be interpreted as illustrative and not in any limiting sense.

Having described what is new and novel and desired to secure by Letters Patent, what is claimed is:

1. An improved tape cassette storage container adapted for molding in a unitary structure, said container comprising a first substantially flat rectangular surface;

opposed end walls and a side wall disposed proximate the outer edge of said first surface;

a spine member hingedly molded to the edge of said first surface opposite said side wall, having upstanding tabs disposed proximate each end thereof, each said tab being disposed inwardly of the end walls on said first surface and having an aperture disposed therethrough;

a second substantially flat rectangular surface hingedly molded to the edge of said spine member opposite said first surface;

a lip member disposed proximate the edges of said second surface other than the edge adjacent said spine member, said lip member being in substantial linear alignment with said tabs on the ends of said spine member;

an upwardly extending member disposed at each end of said lip member adjacent said spine member, each said member having an outwardly extending tab disposed thereon such that rotation of said spine member and said second surface toward one another causes said outwardly extending tabs on said upwardly extending members to engage said apertures disposed in said upstanding tabs disposed at the ends of said spine member, whereby said spine member is retained at substantially a right angle with respect to said second surface; and whereby rotation of said first surface toward said spine member causes said end and side walls on said first surface to engage the outer surface of said lip member on said second surface to thereby provide a closed container.

2. A container as defined in claim 1 further including latching means hingedly molded to the edge of said second surface opposite said spine member, said latching means having a touch plate, integrally molded leaf springs disposed at opposed edges of said touch plate adjacent said second surface, integrally molded stop tabs disposed at said opposed edges of said touch plate outwardly of said leaf springs and an integrally molded locking tab extending outwardly from the edge of said touch plate opposite said second surface;

said lip member having an aperture therein in alignment with and of a dimension substantially equal to said touch plate of said latching means;

first and second spring retaining means extending inwardly from said lip member;

whereby rotation of said latching means toward said second surface causes said leaf springs to engage said spring retaining means and said stop tabs to engage the inner surface of said lip member such that said touch plate and locking tab may be deflected inwardly against said leaf springs while being restrained against outward deflection by said stop tabs;

said side wall on said first surface having an aperture therein adjacent said first surface and in alignment with the locking tab of said latching means;

such that upon closing said container said locking tab engages said aperture in said side wall and disengages said aperture upon inward deflection of said touch plate for opening said container.

3. A container as defined in claim 2 further including a strength rib molded in said second surface, and extending between said first and second spring retaining means.

4. A container as defined in claim 2 further including a first plurality of cassette locator tabs extending inwardly from said lip member a distance greater than the inward dimension of said spring retaining means such that a cassette placed in said container is prevented from engaging said spring retaining means.

5. A container as defined in claim 1 further including a plurality of notched locator tabs molded in the inner surface of said side wall on said first surface and adapted to engage said lip member when said container is closed.

6. A container as defined in claim 5 further including a strength rib molded in said first surface and extending between said plurality of notched locator tabs.

7. A container as defined in claim 4 further including a plurality of locator cushions molded on the inner surface of the ends of said lip member such that said container is adapted to receive and retain a cassette of a first size.

8. A container as defined in claim 7 further including a second plurality of cassette locator tabs extending upwardly from said second surface and disposed such as to receive and retain a cassette of a second size smaller than said first size.

9. An improved tape cassette storage container adapted for molding in a unitary structure, said container comprising a first substantially flat rectangular surface;

opposed end walls and a side wall disposed proximate the outer edge of said first surface;

a spine member hingedly molded to the edge of said first surface opposite said side wall, having upstanding tabs disposed proximate each end thereof, each said tab being disposed inwardly of the end walls on said first surface;

a second substantially flat rectangular surface hingedly molded to the edge of said spine member opposite said first surface;

a lip member disposed proximate the edges of said second surface other than the edge adjacent said spine member and being substantially in linear alignment with said tabs on the ends of said spine member;

latching means hingedly molded to the edge of said second surface opposite said spine member, said latching means having a touch plate, integrally molded leaf springs disposed at opposite edges of said touch plate adjacent said second surface, integrally molded stop tabs disposed of said opposed edges of said touch plate outwardly of said leaf springs, and an integrally molded locking tab extending outwardly from the edge of said touch plate opposite said second surface;

said lip member having an aperture therein in alignment with and of a dimension substantially equal to said touch plate of said latching means;

first and second spring retaining means extending inwardly from said lip member;

whereby rotation of said latching means toward said second surface causes said leaf springs to engage said spring retaining means and said stop tabs to engage the inner surface of said lip member and said touch plate and locking tab may be deflected inwardly against said leaf springs while being restrained against outward deflection by said stop tabs;

said side wall on said first surface having an aperture therein adjacent said first surface and in alignment with the locking tab of said latching means;

such that upon closing said container said locking tab engages said aperture in said side wall and disengages said aperture upon inward deflection of said touch plate for opening said container.

* * * * *